(12) United States Patent
Handa et al.

(10) Patent No.: US 8,732,041 B2
(45) Date of Patent: *May 20, 2014

(54) REPLICATING DATA IN FINANCIAL SYSTEMS

(75) Inventors: Neerav Handa, Sunnyvale, CA (US); Debashis Sadhukhan, Milpitas, CA (US); Byung-Hyun Chung, Danville, CA (US); Xin Wang, Los Altos, CA (US); Min Zhu, Pleasanton, CA (US); Craig Hushaw, Stockton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/353,799

(22) Filed: Jan. 19, 2012

(65) Prior Publication Data

US 2012/0136778 A1    May 31, 2012

Related U.S. Application Data (62) Division of application No. 12/365,950, filed on Feb. 5, 2009, now Pat. No. 8,108,273.

(51) Int. Cl.
*G06Q 40/00* (2012.01)
(52) U.S. Cl.
USPC .......................................................... 705/30
(58) Field of Classification Search
USPC .......................................................... 705/30
See application file for complete search history.

(56) References Cited

U.S. PATENT DOCUMENTS

| | | |
|---|---|---|
| 5,134,564 A | 7/1992 | Dunn et al. |
| 5,864,851 A | 1/1999 | Breitbart et al. |
| 6,006,204 A | 12/1999 | Malcolm |
| 7,044,365 B2 | 5/2006 | Witherspoon |
| 7,403,917 B1 | 7/2008 | Larsen |
| 8,108,273 B2 * | 1/2012 | Handa et al. ............ 705/30 |
| 2003/0074288 A1 | 4/2003 | Quine |

FOREIGN PATENT DOCUMENTS

| | | |
|---|---|---|
| WO | 02/79934 | 3/2002 |
| WO | 03/032130 | 4/2003 |

OTHER PUBLICATIONS

Phatak, Shirish Hemant et al., "Transaction Centric Reconciliation in Disconnected Client-Server Databass"; Mobile Networks and Applications 9, pp. 459-471.
Treasury Software, "Bank Reconciliation—Automated Matching of Financial Transactions", http://www.treasurysoftware.com/PDF/BankReconciliation_ProductSheet.pdf.

* cited by examiner

*Primary Examiner* — Shay S Glass
(74) *Attorney, Agent, or Firm* — Miles & Stockbridge P.C.

(57) ABSTRACT

Systems and methods for deciding whether to void a payment are provided. The method includes sending a signal to a web service provider to request information as to whether a payment has been reconciled, and receiving a first response from the web service provider. If the first response from the web service provider indicates that the payment has not been reconciled: performing a void process to void the payment, committing data related to the void process to an interface table, and receiving a second response from the web service provider. The second response includes status information of the payment replicated from a second interface table associated with the web service provider to the interface table. If the first response from the web service provider indicates that the payment has already been reconciled, deciding not to perform the void process.

15 Claims, 5 Drawing Sheets

FIG. 7

REPLICATING DATA IN FINANCIAL SYSTEMS

CROSS-REFERENCE TO RELATED APPLICATIONS

This application is a division of and claims priority to U.S. application Ser. No. 12/365,950, filed on Feb. 5, 2009, now U.S. Pat. No. 8,108,273, the content of which is hereby incorporated by reference.

FIELD

The present disclosure generally relates to replicating data within multiple databases. More particularly, the embodiments described herein relate to systems and methods for replicating data in multiple financial systems.

BACKGROUND

Bank statement reconciliation is a process of reconciling or matching lines of a bank statement with actual transactions or customer's internal records. The customer, in this situation, may be an enterprise, corporation, business, family, individual, or other entity.

In business enterprises, a customer may deploy financial software applications in such a way that data is distributed across multiple database instances. This can provide flexibility in managing the applications on different parts of the enterprise. An enterprise may handle data associated with a first software application pertaining to payroll, for example, and also handle similar data for another software application pertaining to auto-reconciliation, for example.

One solution for allowing accessibility to financial information stored in two different databases is to store transaction data in one database, such as the one associated with the payroll application, for example, and allowing the reconciliation software to access the transaction data. However, this would result in poor performance since auto-reconciliation functionality is computationally intensive and ideally requires the transaction data to be local.

An alternative solution that does not suffer from poor performance is to replicate payroll transaction data from the payroll database to the reconciliation database at regular intervals. However, the technique of maintaining multiple sources of data suffers from the problem of data conflicts, because users associated with the two different databases could potentially work on two copies of the same data at substantially the same time. A conflict might not be recognized until later when synchronization of data is attempted. Of course, this problem would not occur if there were only one set of data transactions.

Therefore, there appears to be contradictory objectives in this respect. On the one hand, it is desirable to allow applications to operate on information stored locally for the sake of processing speed. On the other hand, when data is replicated on the multiple databases, it can be difficult to avoid the issue of data conflict.

SUMMARY

The present disclosure describes several embodiments of systems and methods for replicating data on multiple databases. According to one embodiment, among several, a data replication system includes a first interface table, a first application, and a first replication module, each associated with a first computing system. The first application is configured to transfer data into the first interface table. The first replication module is configured to replicate data from the first interface table into a second interface table associated with a second computing system via a network. The data replication system also includes a second application and second replication module, each associated with the second computing system. The second application is configured to transfer data into the second interface table. The second replication module is configured to replicate data from the second interface table into the first interface table via the network. The data replication system further includes a web service module configured to check the contents of the second interface table before the first application performs a specific processing operation.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

When data is stored in one location and needed by an application in another location, replication of data can be advantageous to allow applications to operate on the data in local memory. Otherwise, the speed of processing can be undesirably low. However, with multiple copies available to multiple users, the issue of data conflict can arise, which is unacceptable, especially with respect to financial transactions. The present disclosure describes systems and methods for accomplishing both objectives of replicating data on multiple databases while preventing the occurrence of data conflicts.

Although many data replication examples described herein are related to multiple financial-type applications, it should be understood that the present disclosure should not be limited merely to financial applications, but can encompasses any type of system where data is replicated for multiple applications on respective databases. In addition, although the present disclosure describes the function of replication between two applications, it should also be understood that the systems and methods described herein may also apply to replication data onto any number of related applications on respective databases.

Figure 1:
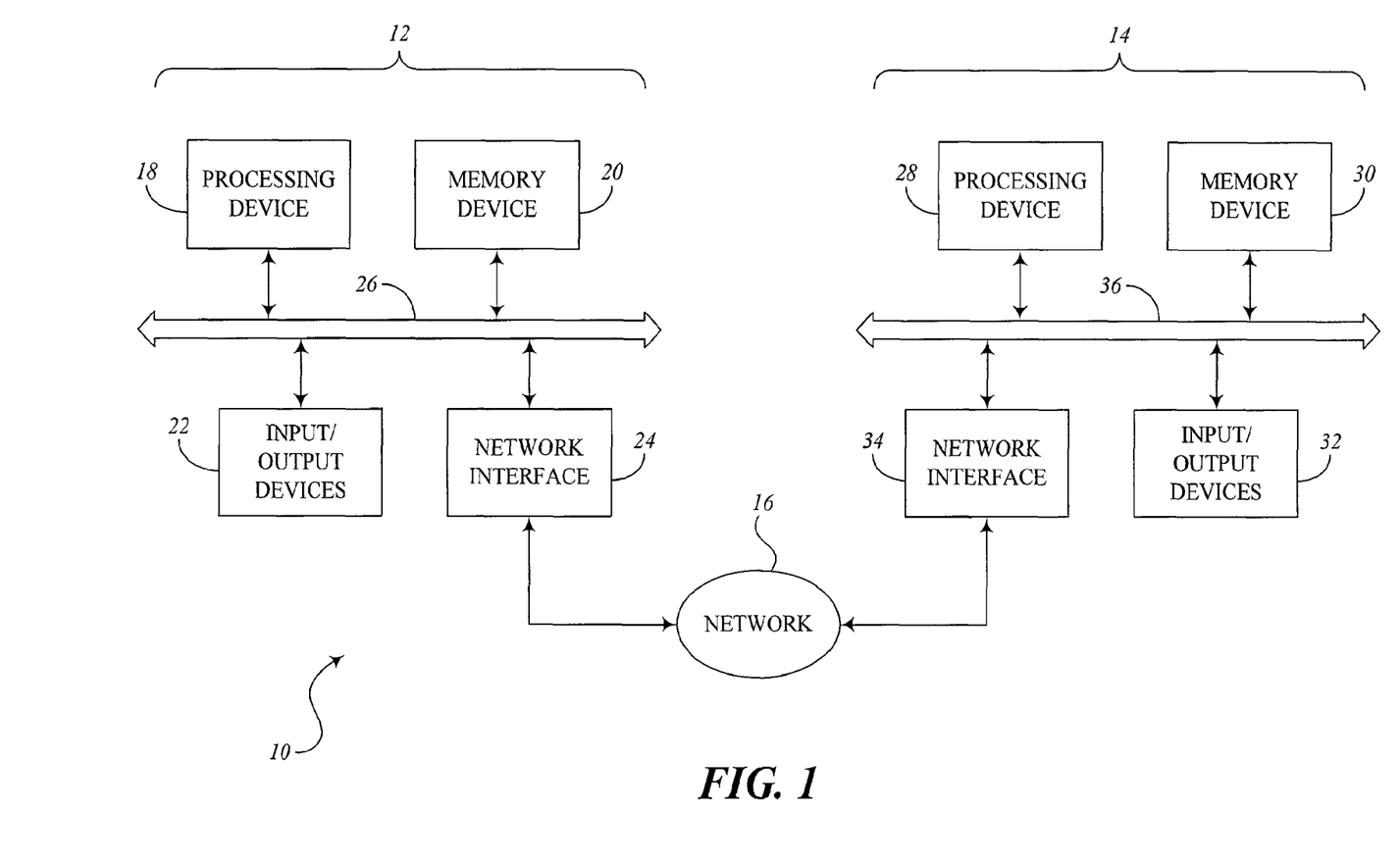
FIG. 1 is a block diagram illustrating a data replication system according to a first embodiment.

FIG. 1 is a block diagram illustrating a first embodiment of a data replication system 10. In this embodiment, data replication system 10 includes a first computing system 12 and a second computing system 14, where the computing systems are able to communicate with each other via a network 16. First computing system 12 includes, among other things, a processing device 18, a memory device 20, input/output devices 22, and a network interface 24, each interconnected via a bus 26. Second computing system 14 includes, among other things, a processing device 28, a memory device 30, input/output devices 32, and a network interface 34, each interconnected via a bus 36.

Each of the first and second computing systems 12, 14 may be any suitable type of computer, data processing system, or other electronic device for executing logic instructions, e.g., software applications. Processing devices 18, 28 may be general-purpose or specific-purpose processors or microcontrollers. Memory devices 20, 30 may each include one or more internally fixed storage units, removable storage units, and/or remotely accessible storage units. The storage units may be configured using any suitable combination of volatile memory and/or non-volatile memory to store information, data, instructions, and/or software code.

Input/output devices 22, 32 of each computing system may include input mechanisms such as keyboards, keypads, cursor control devices, or other data entry devices. The input mechanisms enable a user to enter information or instructions. Also, input/output devices 22, 32 may include output devices, such as computer monitors, display screens, audio output devices, printers, or other peripheral devices for communicating information to the user. In general, computing systems 12, 14 comprise logic processing, which may be implemented in software, firmware, hardware, or any combination thereof. The logic processing can be configured to control graphical user interfaces (GUIs) or other suitable data presentation and/or interaction systems of input/output devices 22, 32.

Network interfaces 24, 34 may include wired and/or wireless communication devices for enabling communication between buses 26, 36, respectively, and network 16. Network 16 may be a local area network (LAN) or wide area network (WAN), such as the World Wide Web or Internet. In some embodiments, network 16 may include any combination of publicly accessible networks and/or private networks. Computing system 12 and computing system 14 may be associated with a single enterprise, or, in other embodiments, two or more different enterprises. In the example of the computing systems being part of one enterprise, the computing systems may be positioned in different locations, even different cities or countries. In this respect, network 16 can be used to allow communication between the computing systems for sharing information as needed.

In operation, data replication system 10 can replicate data stored in one memory device, e.g., memory device 20, and store that data on the other memory device, e.g., memory device 30. The transfer path in this instance would include network interfaces 24, 34 and network 16. In addition to normal data replication procedures, data replication system 10 further includes web service communication via network 16 to request certain operations from one computing system, e.g., computing system 12, that may also involve the other computing system, e.g., computing system 14. The web service includes checking the contents of the other memory device, e.g., memory device 30, to make sure that the requested operation would not create a data conflict. If it would, the operation is not followed through and a conflict is avoided. If no conflict would arise, the operation can continue and data can be replicated in a normal fashion.

Figure 2:
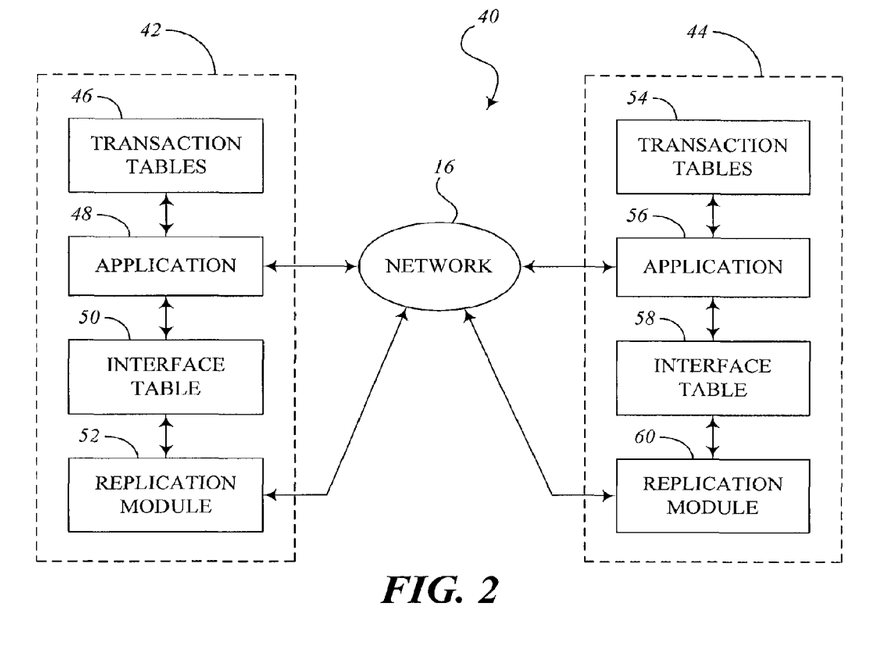
FIG. 2 is a block diagram illustrating a data replication system according to a second embodiment.

FIG. 2 is a block diagram illustrating a second embodiment of a data replication system 40. In this embodiment, data replication system 40 includes a first database 42 and a second database 44, where wired and/or wireless communication between the databases is possible through network 16. Database 42 may be associated with first computing system 12 shown in FIG. 1. For example, database 42 may be fully or partially stored in memory device 20. In some embodiments, portions of database 42 may be configured in hardware and incorporated in processing device 18 of first computing system 12. Likewise, database 44 may be associated with second computing system 14 shown in FIG. 1 and may be fully or partially stored in memory device 30. In some embodiments, portions of database 44 may be configured in hardware and incorporated in processing device 28 of second computing system 14.

As shown in this embodiment, database 42 includes transaction tables 46, an application 48, an interface table 50, and a replication module 52. Similarly, database 44 includes transaction tables 54, an application 56, an interface table 58, and a replication module 60. Applications 48 and 56 may be software applications, such as financial software applications. In some embodiments, application 48 is a payroll software application and application 56 is a bank reconciliation software application.

In operation, application 48 accesses and processes data from application 48 itself and/or from transaction tables 46 and stores the new or amended data associated with the respective processes of application 48 in transaction tables 46 as needed. While processing the data, application 48 determines which portion of the transaction data, if any, may be related to information that is to be shared with second database 44. Application 48 transfers the related data from transaction tables 46 to interface table 50. When new or amended data is transferred to interface table 50, as detected either by interface table 50 or replication module 52, replication module 52 is configured to copy that data over to second database 44. The data transfer can be made through network 16, as is illustrated in FIG. 2, or according to alternative embodiments, can bypass network 16.

In a similar manner, application 56 accesses and processes data from application 56 itself and/or from transaction tables 54 and stores the new or amended data associated with the respective processes of application 56 in transaction tables 54. During processing, application 56 determines which portion of the transaction data, if any, may be related to information that is to be shared with first database 42. Application 56 transfers the related data from transaction tables 54 to interface table 58. When new or amended data is transferred to interface table 58, as detected either by interface table 58 or replication module 60, replication module 60 copies the data over to first database 42. The transfer can be made through network 16 or can bypass network 16.

Application 48 may be a payroll application and application 56 may be a cash management or reconciliation program, as suggested above. In this respect, interface table 50 may contain the transaction information that might be needed by the reconciliation functionality of application 56. Similarly, interface table 58 may contain the transaction information that might be needed by the payroll functionality of application 48. The information in interface tables 50, 58 is replicated or copied over to the interface table of the other database, thereby allowing quick access to the information by the payroll and/or reconciliation processes when needed.

Replication module 52 is configured to copy data, which is to be shared with database 44, from interface table 50 and transfers the data to interface table 58 via network 16. In addition, replication module 60 is configured to copy data, which is to be shared with database 42, from interface table 58 and transfer the data to interface table 50 via network 16. Replication modules 52, 60 thereby keep interface tables 50, 58 updated with changes made to information in each database 42, 44. Information that is related to or needed in the other database can be replicated over to that database by replication modules 52, 60.

Also shown in the embodiment of FIG. 2 is a set of communications between application 48 and application 56 via network 16. This set of communications represents a web service as defined in detail below. In this way, data replication system 40 can use an innovative combination of data replication and web-services to achieve both objectives of conflict-free data and high performance. Application 48 can request that application 56 check the contents of interface table 58 before application 48 performs certain operations or before application 48 transfers data into interface table 50. Specifically, application 48, which acts as a web service requester, makes a request to application 56, which acts as the web service provider. If operations in database 44 are made that alter the data in such a way that a conflict would arise if application 48 of database 42 were to perform certain operations on that same data, then application 56 can notify application 48 that the operations should be discontinued. In this way, data conflict can be avoided. In other embodiments, either or both applications 48, 56 can be web service providers.

In the example where application 48 is a payroll application and application 56 is a reconciliation program, data conflict may be an issue when payroll attempts to void a transaction, such as when a routing number is incorrect to thereby prevent an electronic funds transfer (EFT) or if a check is lost by a recipient. However, if a payroll payment has been made and application 56, e.g., reconciliation application, has already reconciled the transaction, then the void process would not be valid in this situation. Therefore, by utilizing the web service that involves checking interface table 58 to determine if a transaction has been reconciled, application 48 can discontinue any operations regarding a void process. It should be understood that other types of related applications running on different databases can have possible conflicting situations that can be checked by the web service arrangement described herein in order to avoid data conflicts or other problems.

The request from application 48 is sent to the web service to request that the web service perform particular processing procedures. In some embodiments, the web service may be associated with application 56, but in other embodiments, the web service may be associated with a third party provider. Also, database 42 and database 44 may be part of the same enterprise, organization, business, etc., or part of different entities. Even when part of the same enterprise, databases 42 and 44 may communicate with each other over an external network, such as the Internet.

Figure 3:
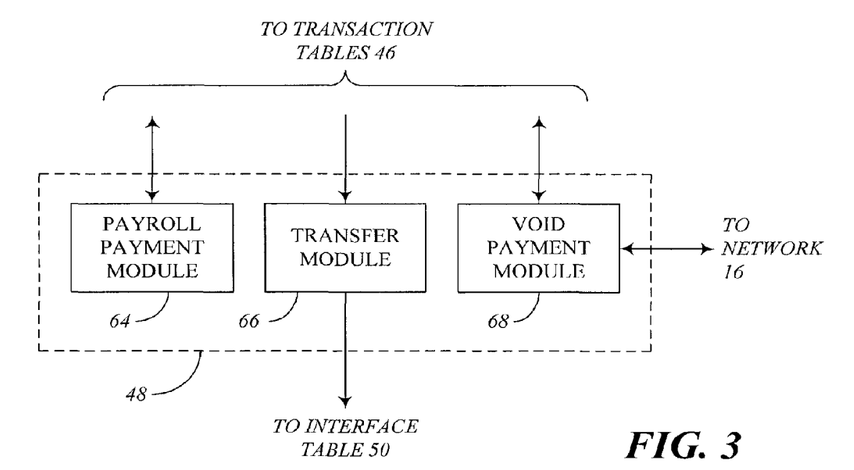
FIG. 3 is a block diagram illustrating the application of the first database shown in FIG. 2, according to one embodiment.

FIG. 3 is a block diagram illustrating an embodiment of application 48 shown in FIG. 2. In this embodiment, application 48 is a payroll application including a payroll payment module 64, a transfer module 66, and a void payment module 68. Payroll payment module 64 is configured to perform normal payroll processing tasks. Payroll payment module 64 can access data from transaction tables 46 as needed to process the data and store the data back into transaction tables 46.

Transfer module 66 is configured to allow access of the transaction information that may be needed by the other database 44. Specifically, transfer module 66 transfers the information related to the processes run by the other database 44, e.g., information related to reconciliation, from transaction tables 46 to interface table 50. In some embodiments, transfer module 66 may transfer information from interface table 50 back into transaction tables 46.

When certain transactions are performed in database 42, web services can be called when needed. In the embodiment shown in FIG. 3, application 48 includes void payment module 68, which is configured to request a web service when payroll payment module 64 is instructed to void a payment. Void payment module 68 in this case is the requesting module that sends a request to a web service via network 16. After the web service performs its particular duties, it sends a response back to void payment module 68 to indicate whether the specific payment to be voided has already been reconciled or not. If it has already been reconciled, which would cause a conflict if the payment were then voided, then payroll payment module 64 does not proceed with the void process. In some embodiments, when such a conflict is detected, payroll payment module 64 may provide an indication to a user that the void process could not be carried through because of the conflict caused by the other application having already reconciled the payment. However, if the web service returns back with an indication that the payment has not yet been reconciled, then payroll payment module 64 can proceed with the void process.

Application 48 can be implemented in software and/or hardware. In some embodiments, a computer readable medium may be configured to store instructions that are executable by a processing device, such as processing device 18 (FIG. 1). For example, the computer readable medium may contain at least a portion of application 48. In this respect, the computer readable medium may comprise logic adapted to perform actions on payroll information of an enterprise and store the payroll information in transaction tables 46. Also, the computer readable medium may include logic adapted to transfer a portion of the payroll information stored in transaction tables 46 to interface table 50. For instance, payroll information corresponding to the payment status of one or more payments may be transferred. The payment status may include information related to the reconciliation status of the payment and if the payment has been voided. If it is verified that the payroll payment has not already been reconciled, the logic adapted to transfer is configured to commit data related to the voided payroll payment to transaction tables 46.

A replication process related to replication module 52 is configured to replicate the payroll information in interface table 50 onto interface table 58 associated with another processing device or database. The computer readable medium also includes logic adapted to run a void process, the void process including requesting a web service to verify if a payroll payment has already been reconciled. If not already reconciled, the void process continues to void the payroll payment, but if already reconciled, it discontinues the void process.

Figure 4:
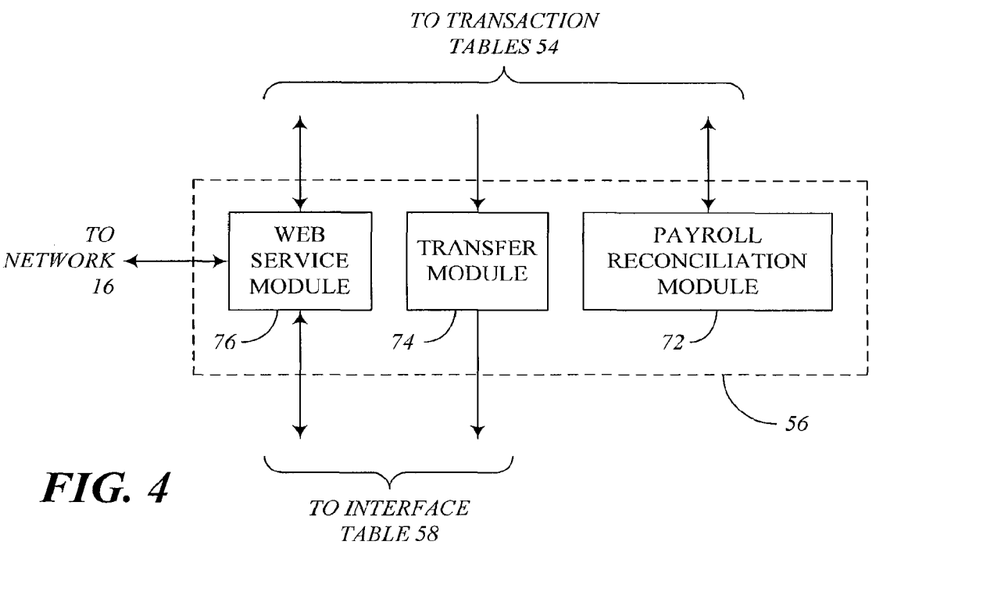
FIG. 4 is a block diagram illustrating the application of the second database shown in FIG. 2, according to one embodiment.

FIG. 4 is a block diagram illustrating an embodiment of application 56 shown in FIG. 2. In this embodiment, application 56 is a bank reconciliation application including a payroll reconciliation module 72, a transfer module 74, and a web service module 76. Payroll reconciliation module 72 is configured to perform normal bank reconciliation tasks, e.g., comparing lines of a bank statement with financial transactions recorded in internal records. Payroll reconciliation module 72 can access data from transaction tables 54 as needed to process the data and store the data back into transaction tables 54.

Transfer module 74 is configured to allow access of the transaction information that may be needed by the other database 42. Specifically, transfer module 74 transfers the information related to the processes run by the other database 42, e.g., information related to payroll processing, from transaction tables 54 to interface table 58. In some embodiments, transfer module 74 may transfer information from interface table 58 back into transaction tables 54.

Web service module 76, according to the embodiment shown in FIG. 4, is part of application 56. In other embodiments, some or all of the components of the web service or web service module 76 may reside elsewhere. Web service module 76 is configured to receive a request from a requester, e.g., application 48. In response, web service module 76 checks with interface table 58 to see the status of certain information that relates to the requestor.

Figure 5:
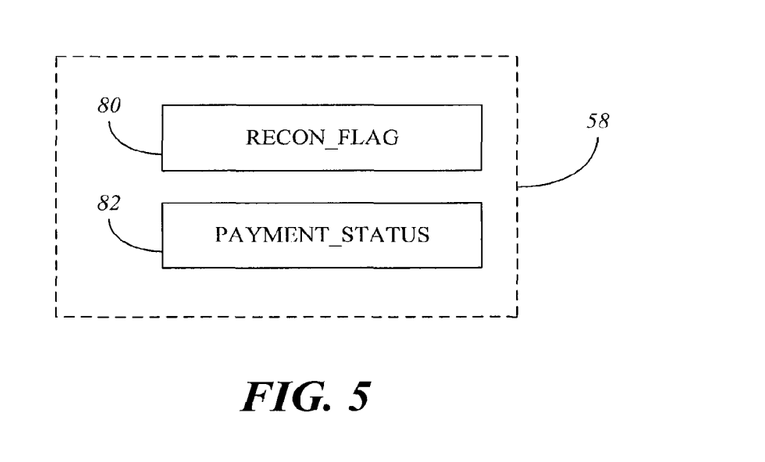
FIG. 5 is a block diagram illustrating the interface table of the second database shown in FIG. 2, according to one embodiment.

FIG. 5 is a block diagram illustrating an embodiment of interface table 58 of database 44 shown in FIG. 2. In this embodiment, interface table 58 contains, among other things, a first register 80 and a second register 82. First register 80 is intended to store a reconciliation flag, or "recon_flag," and second register 82 is intended to store information regarding the payment status of one or more financial transactions. In particular, second register 82 records "payment_status," which can indicate whether the transaction has been "paid," "voided," and so on. In other embodiments, interface table 58 may include a paid flag, i.e., "paid_flag," and a void flag, i.e., "void_flag," instead of the payment status record.

Referring back to FIG. 4 regarding the web service, particularly a void process web service request, web service module 76 checks to see the status of recon_flag register 80. If the recon_flag is set to "yes," indicating that the payment has already been reconciled, then web service module 76 recognizes the conflict with voiding such a transaction and replies back to the requestor that there is a failure. However, if recon_flag is set to "no," indicating that the payment has not been reconciled, then web service module 76 determines that the void process can run with success. In this case, web service module 76 sets the payment_status to "void" to indicate that the status of this payment is voided. With this flag set in interface table 58, replication module 60 (FIG. 2) replicates this information over to database 42 to communicate that the payment has already been recorded as being voided. Furthermore, web service module 76 sends a reply to the requestor to indicate success or failure of a void process. Thus, with this verification, the requestor can proceed with the void process or stop the void process, whichever is appropriate.

Application 56 can be implemented in software and/or hardware. In some embodiments, a computer readable medium may be configured to store instructions that are executable by a processing device, such as processing device 28 of computing system 14 (FIG. 1). For example, the computer readable medium may contain at least a portion of application 56. In this respect, the computer readable medium may comprise logic adapted to perform bank reconciliation actions on payroll information of an enterprise and store the payroll information in transaction tables 54. The computer readable medium may also include logic adapted to transfer a portion of the payroll information stored in transaction tables 54 to interface table 58. A replication process corresponding to replication module 60 (FIG. 2) is configured to replicate the payroll information in interface table 58 onto interface table 50 associated with the other processing device or database.

The computer readable medium also includes logic adapted to run a web service, which includes receiving a request from a requestor to void a payroll payment and determining if the payroll payment has been reconciled. If it has not already been reconciled, the web service is configured to send a message to the requester indicating that the payroll payment has not been reconciled and also updates the status of the payroll payment in interface table 58 to indicate that the payroll payment is voided. If it has already been reconciled, then the web service sends a failure message to the requester.

The web service can determine if the payroll payment has been reconciled by checking the reconciliation flag of register 80 stored in interface table 58. The status of the voided payroll payment is replicated from interface table 58 to the other interface table 50 by replication module 60.

Figure 6:
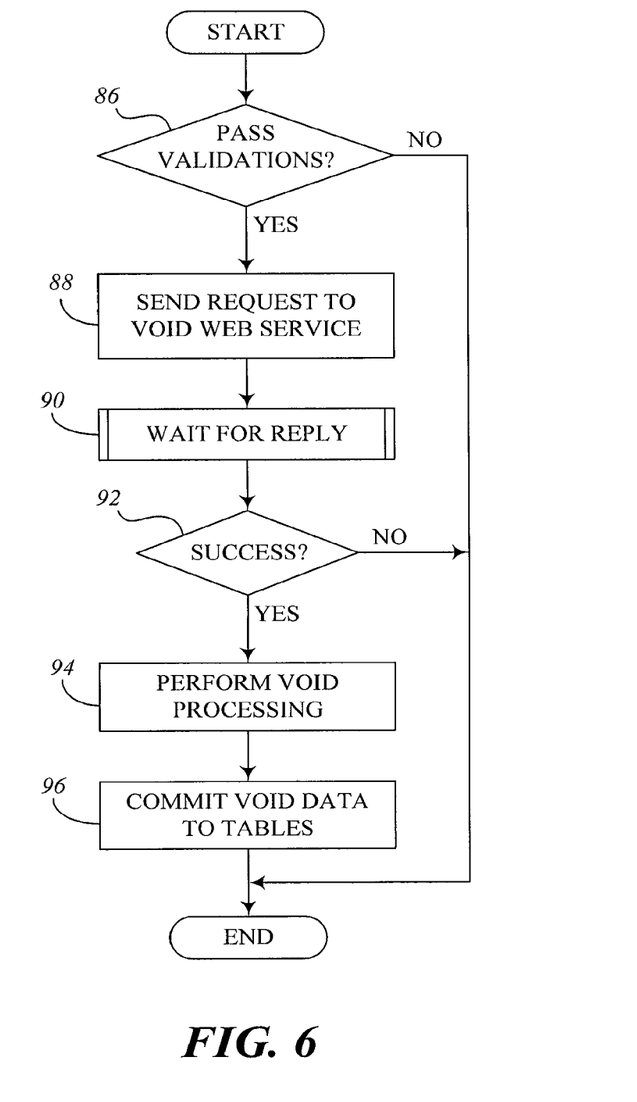
FIG. 6 is a flow diagram illustrating a method of the application of the first database shown in FIG. 2, according to one embodiment.

FIG. 6 is a flow diagram illustrating an embodiment of a method associated with the operations and functionality of a web service requestor in a replication system. For example, the web service requestor may include the first computing system 12 (FIG. 1), first database 42 (FIG. 2), application 48, or other requestor as would be understood by one of ordinary skill in the art.

As indicated in decision block 86, it is determined whether or not validations are passed. In particular, void validations can be checked using the payroll database, such as to make sure that a payment is not already voided earlier or to check for other issues. This validation can be made before other processes so as to improve performance of the void process. According to some implementations, the validation test might include checking a reconciliation flag in an interface table associated with a payroll application. If validations are not passed, there is no point in calling the web service and the method ends. However, if validations pass, the method proceeds to block 88.

According to block 88, a request is sent to a void web service. The request represents an instruction for the void web service to observe the data stored in an interface table to find out the status of a particular payment to be voided. More generally, block 88 may include sending a signal to the void web service to request information about a payroll payment. As indicated in block 90, the method then waits for a reply from the web service. In decision block 92, it is determined whether or not the reply back from the web service indicates success. For instance, success in this case represents the status of the payment to be voided as not having been reconciled. Thus, the void process can be run without conflict and the method proceeds to block 94. However, if failure is indicated, or no success, the void process is discontinued and the method ends.

Block 94 indicates that the void processing is performed, which is allowed to continued when it is verified by the web service that there are no conflicts. Also, as indicated in block 96, the void data associated with the void processing is committed to memory or tables, such as transaction tables. This routine can be run for any transaction on which a void process is to be performed.

Figure 7:
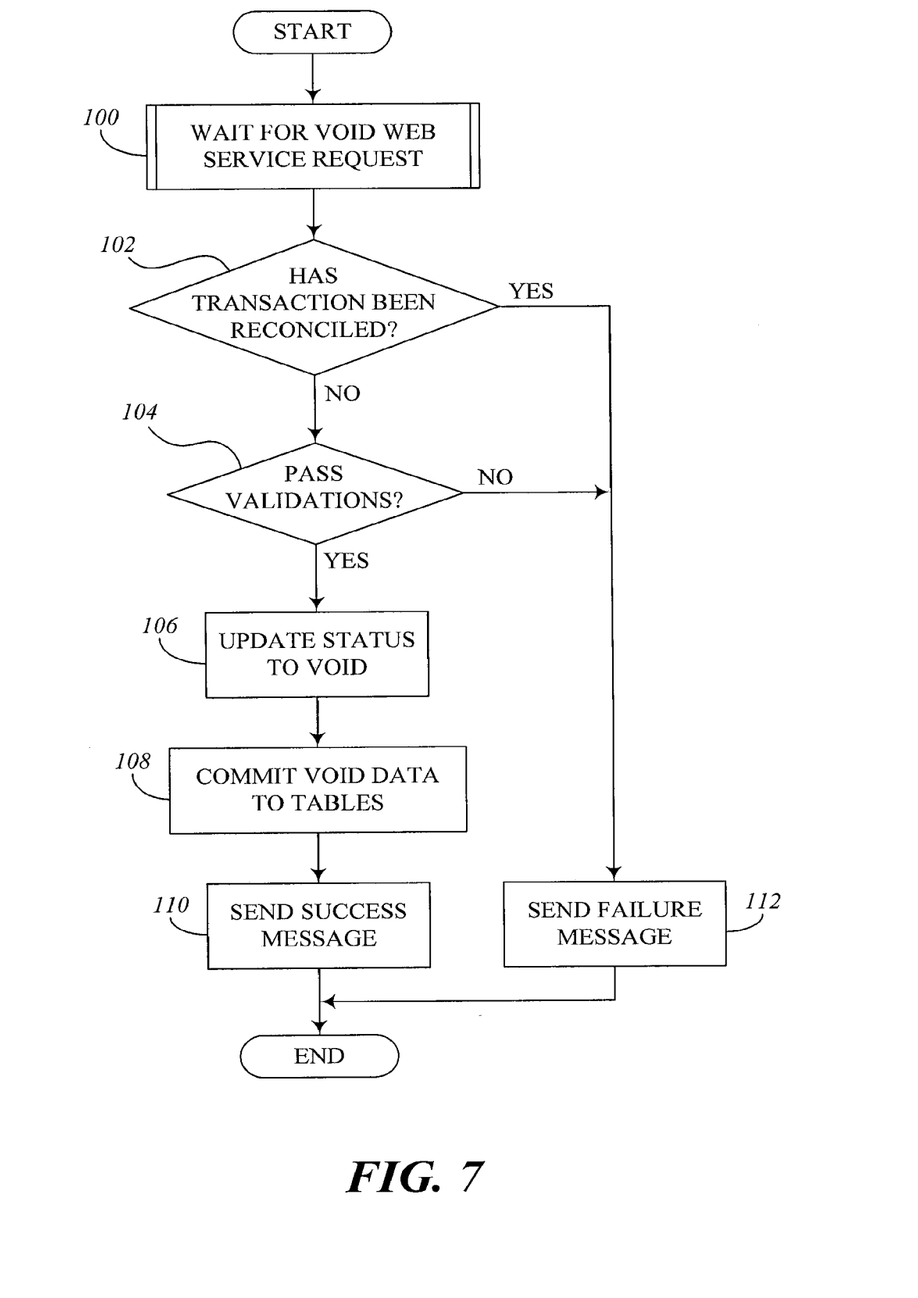
FIG. 7 is a flow diagram illustrating a method of the application of the second database shown in FIG. 2, according to one embodiment.

FIG. 7 is flow diagram illustrating an embodiment of a method associated with the operations and functionality of a web service provider in a replication system. For example, the web service provider may include the second computing system 14 (FIG. 1), second database 44 (FIG. 2), application 56 (FIG. 2), or other provider as would be understood by one of ordinary skill in the art. It should also be understood that FIGS. 6 and 7 may be combined to represent the functionality of an entire replication system, such as data replication system 10 of FIG. 1, data replication system 40 of FIG. 2, or other suitable replication system.

As indicated in block 100, the method includes waiting for a void web service request from an external requester. The request may include a request to void a financial transaction. When a request is received, it is determined whether or not a specific transaction has been reconciled, as indicated in decision block 102. According to more generic embodiments, this procedure may include any type of check to see if a data conflict would arise if a specific request is actually followed through. In the example of financial web services, this procedure may include checking a reconciliation flag, e.g., recon_flag, to determine if the transaction has been reconciled. If the transaction has already been reconciled, which would preclude later voiding, then the method proceeds to block 112, which is described later. Otherwise, if the transaction has not already been reconciled, the method proceeds to decision block 104, which indicates that a determination is made as to whether validations are passed. This validation test may include checking to see if there was a database failure or other problem. In some embodiments, the validation check may include observing the status of the payment or transaction, e.g., payment_status, to see if it is voided.

If validations are not passed, then the method goes to block 112. However, if validation are passed, the method proceeds to block 106. As indicated in block 106, the status, e.g., payment_status, of the transaction is updated to "void." Since this status update is provided in an interface table, the information about the status is automatically replicated over to the requestor, e.g., payroll application. Then, the void data is committed or saved onto tables, such as transaction tables, as indicated in block 108.

After updating the status to void and committing the void data to tables, the method includes sending a message to the requestor that the void is a success, as indicated in block 110. Otherwise, if failure occurs as a result of the determinations in blocks 102 or 104, then block 112 indicates that a failure message is sent to the requestor. The failure message, for example, may include an instruction to discontinue the void process.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A computer implemented method associated with a web service provided by a computing system, the method comprising:

receiving a request from a remote requestor to perform a status check on an object on which the requestor intends to run a void process;

determining whether or not running the void process on the object would create a data conflict with respect to status information stored in an interface table of the computing system;

if it is determined that the void process would not create a data conflict:

updating the status information of the object to indicate that the void process has been run, sending a first message to the requestor that the void process was a success, and sending the status information from the interface table in a second message to the requestor; and if it is determined that the void process would create a data conflict, sending a message to the requestor that the void process was a failure.

2. The method of claim 1, wherein the object is a payroll transaction.

3. The method of claim 2, wherein determining whether running the void process on the object would create a data conflict or not includes determining if the payroll transaction has already been reconciled.

4. The method of claim 1, wherein, when it is determined that the void process would not create a data conflict, the method further comprises committing data related to the void process into tables associated with the web service.

5. A computer readable medium configured to store instructions that, when executed by a processing device, causes the processing device to perform a process comprising:

receiving a request from a remote requestor to perform a status check on an object on which the requestor intends to run a void process;

determining whether or not running the void process on the object would create a data conflict with respect to status information stored in an interface table of the computing system;

if it is determined that the void process would not create a data conflict:

updating the status information of the object to indicate that the void process has been run, sending a first message to the requestor that the void process was a success, and sending the status information from the interface table in a second message to the requestor; and if it is determined that the void process would create a data conflict, sending a message to the requestor that the void process was a failure.

6. The computer readable medium of claim 5, wherein the object is a payroll transaction.

7. The computer readable medium of claim 6, wherein determining whether running the void process on the object would create a data conflict or not includes determining if the payroll transaction has already been reconciled.

8. The computer readable medium of claim 5, wherein, when it is determined that the void process would not create a data conflict, the process further comprising committing data related to the void process into tables associated with the web service.

9. A web server system comprising:

a processor;

a memory device coupled to the processor and storing instructions that, when executed by the processor, cause the processor to, in response to a request from a remote requestor, perform a status check on an object on which the requestor intends to run a void process, the memory device further storing an interface table, the status check comprising:

determining whether or not running the void process on the object would create a data conflict with status information stored in the interface table;

if it is determined that the void process would not create a data conflict:
  updating the status information of the object to indicate that the void process has been run;
  sending a first message to the requestor that the void process was a success; and
  sending the status information from the interface table in a second message to the requestor; and if it is determined that the void process would create a data conflict, sending a message to the requestor that the void process was a failure.

10. The web server system of claim 9, wherein the object is a payroll transaction.

11. The web server system of claim 9, wherein determining whether running the void process on the object would create a data conflict or not includes determining if the payroll transaction has already been reconciled.

12. The web server system of claim 9, wherein, when it is determined that the void process would not create a data conflict, the process further comprising committing data related to the void process into tables associated with the web service.

13. The method of claim 1, wherein the determining whether or not running the void process on the object would create a data conflict comprises checking a reconciliation flag.

14. The computer readable medium of claim 5, wherein the determining whether or not running the void process on the object would create a data conflict comprises checking a reconciliation flag.

15. The web server system of claim 9, wherein the determining whether or not running the void process on the object would create a data conflict comprises checking a reconciliation flag.

* * * * *

UNITED STATES PATENT AND TRADEMARK OFFICE
CERTIFICATE OF CORRECTION

| | | |
|---|---|---|
| PATENT NO. | : 8,732,041 B2 | Page 1 of 1 |
| APPLICATION NO. | : 13/353799 | |
| DATED | : May 20, 2014 | |
| INVENTOR(S) | : Handa et al. | |

It is certified that error appears in the above-identified patent and that said Letters Patent is hereby corrected as shown below:

On title page, column 2, References Cited under Other Publications, line 2, delete "Databass";" and insert -- Database"; --, therefor.

Signed and Sealed this
Fourteenth Day of October, 2014

Michelle K. Lee
*Deputy Director of the United States Patent and Trademark Office*